United States Patent

[11] 3,612,628

| [72] | Inventor | Henry Jack Steele<br>Moseley, England |
|---|---|---|
| [21] | Appl. No. | 792,919 |
| [22] | Filed | Jan. 22, 1969 |
| [45] | Patented | Oct. 12, 1971 |
| [73] | Assignee | Joseph Lucas (Industries) Limited<br>Birmingham, England |
| [32] | Priority | Jan. 22, 1968 |
| [33] | | Great Britain |
| [31] | | 3213/68 |

[54] GAS BEARINGS
1 Claim, 1 Drawing Fig.

[52] U.S. Cl. ................................................ 308/9
[51] Int. Cl. .......................................... F16c 17/16
[50] Field of Search ............................... 308/9, 122

[56] References Cited
UNITED STATES PATENTS
3,410,616  11/1968  Dee .............................. 368/122

*Primary Examiner*—Fred C. Mattern, Jr.
*Assistant Examiner*—Frank Susko
*Attorney*—Holman, Glascock, Downing & Seebold

ABSTRACT: A gas bearing includes a stator assembly, a hollow ceramic shaft mounted for rotation within the stator assembly and passages in the stator assembly for the supply of gas between the stator assembly and shaft. At least one end of the shaft is secured to a component, and extending through the shaft is a tie bolt holding the component onto the shaft. The tie bolt is tightened to compress the shaft.

PATENTED OCT 12 1971  3,612,628
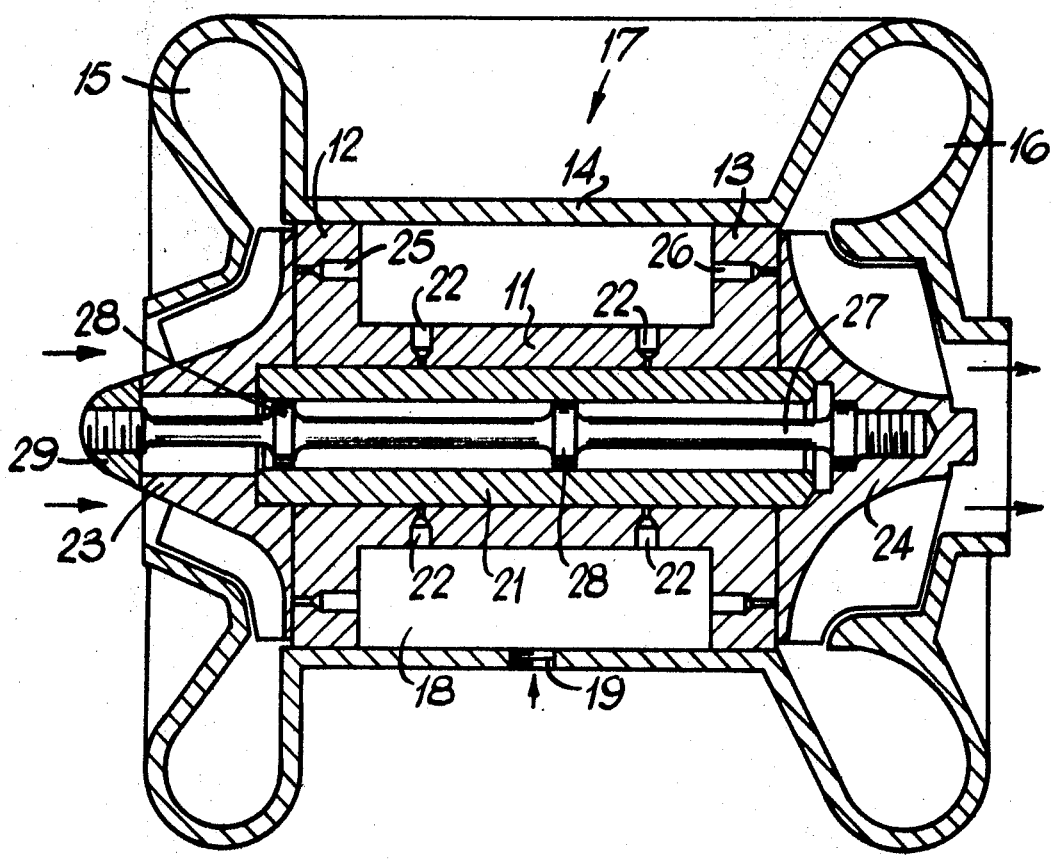
INVENTOR
Henry Jack Steele
BY Holman, Glascock,
Downing & Seebold
ATTORNEYS

GAS BEARINGS

This invention relates to gas bearings, and has particular, though not exclusive, application to turbocompressors employing such bearings.

A gas bearing according to the invention includes a stator assembly, a hollow ceramic shaft, mounted for rotation within said stator assembly, passages in the stator assembly for the supply of gas to the space between the stator assembly and shaft, a component at at least one end of the shaft, and a tie bolt extending through the shaft and holding said component onto the shaft, said tie bolt being tightened sufficiently to ensure that in sue with the opposite ends of the shaft at different temperatures, the tie bolt will still hold the components tightly in place. The accompanying drawing is a sectional side view illustrating one example of the invention as applied to a turbocompressor. Referring to the drawing a stator assembly includes a ceramic sleeve 11 having annular end cheeks 12, 13 and a casing 14 which defines chambers 15, 16 at opposite ends of the stator assembly, the chambers 15, 16 communicating by way of a passage 17 in the casing. Part of the casing 14 defined with the sleeve 11 and end cheeks 12, 13 a chamber 18 of annular cross section having an inlet 19 for the supply to the chamber 18 of compressed air.

Within the sleeve 11 is a hollow ceramic shaft 21 which in use rotates on a cushion of air supplied from the chamber 18 to the space between the sleeve 11 and shaft 21 through passages 22 in the sleeve 11. At opposite ends of the shaft 21 are respectively an aluminum alloy compressor impeller 23 and a turbine impeller 24, both of which are located on the shaft 21 as interference fits. The impellers 23, 24 bear against the outer surfaces of the cheeks 12, 13 respectively, but in use are kept spaced from these surfaces by cushions of air supplied from the chamber 18 through passages 25, 26 respectively. In use, the turbocompressor operates in the usual way, air being drawn into the casing by the impeller 23, compressed and supplied through the chamber 15 to the passage 17, from which it enters the chamber 16 and drives the impeller 24.

Extending through the shaft 21 is a tie bolt 27 which is formed with portions 28 of increased diameter engaging the shaft 21. At one end, the bolt 27 has a screw-threaded connection with the impeller 24, and at its other end extends through a passage in the impeller 23 and engages a nut 29 which acts against the impeller 23 and when tightened holds the entire assembly in position. The assembly places compressive stresses on the shaft 21, as is desirable when using a ceramic shaft. Preferably the shaft 21 and sleeve 11 are formed from silicon nitride.

In operation the turbine impeller 24 will operate at approximately 700°C., whilst the compressor impeller 23 will operate at approximately 20°C. There will be thermal conduction along the tie bolt 27, and along the shaft 21, and because of the large difference in linear coefficients of expansion of the ceramic material and the other components, the tension in the bolt 27, would, under normal circumstances, be completely relaxed at the elevated temperature. This problem is overcome by applying an elastic strain to the bolt 27 in the cold condition by tightening the nut to a valve in excess of the thermal strain which will be experienced in use at the elevated temperature. Thus, when the assembly is heated to the elevated temperature, an adequate force remains to hold the impellers 23, 24 firmly in position. The material of the tie bolt must of course be chosen to have an elastic limit greater than the stress imposed when the nut 29 is tightened. In the particular example shown the overall length of the tie bolt was 6.75 inches, the total length of the three portions of the bolt of reduced diameter shown being 5 inches. The smaller diameter was 0.280 inch, and this diameter was stressed to 32 tons per square inch by tightening the nut 29, so imposing a load of 2 tons per square inch by tightening the nut 29, so imposing a load of 2 tons and an elastic strain of 0.011 inch when cold. The differential expansion of the bolt and ceramic shaft at the operating temperature was 0.008 inch and the resulting residual strain imposed a compressive load of 1 ton on the shaft 21. The tie bolt was manufactured from alloy steel and the shaft 21 from reaction sintered silicon nitride sold under the trade name Roydazine.

I claim:

1. A gas bearing including a stator assembly, a hollow one-piece ceramic shaft, means mounting said shaft for rotation within said stator assembly, passages in the stator assembly for the supply of gas to the space between the stator assembly and shaft, a component at at least one end of the shaft, a tie bolt extending through the shaft and holding said component onto the shaft, said tie bolt being tightened sufficiently to ensure that in use with the opposite ends of the shaft at different temperatures, the tie bolt will still compress said shaft and hold the components tightly in place.